United States Patent
Sasaki et al.

(10) Patent No.: US 6,410,648 B1
(45) Date of Patent: Jun. 25, 2002

(54) TACKY FILMS

(75) Inventors: Yoshihiko Sasaki; Kazutoshi Takenaka, both of Mie (JP)

(73) Assignee: Japan Polychem Corporation, Tokyo (JP)

( * ) Notice: Subject to any disclaimer, the term of this patent is extended or adjusted under 35 U.S.C. 154(b) by 0 days.

(21) Appl. No.: 09/581,817

(22) PCT Filed: Dec. 17, 1998

(86) PCT No.: PCT/JP98/05704

§ 371 (c)(1),
(2), (4) Date: Aug. 24, 2000

(87) PCT Pub. No.: WO99/31169

PCT Pub. Date: Jun. 24, 1999

(30) Foreign Application Priority Data

Dec. 17, 1997 (JP) ............................................. 9-364085

(51) Int. Cl.[7] ........................... C08L 23/00; C08L 23/04
(52) U.S. Cl. ....................................... 525/191; 525/240
(58) Field of Search ................................. 525/191, 240

(56) References Cited

U.S. PATENT DOCUMENTS 4,793,956 A * 12/1988 Nogiwa et al. ................ 264/41

FOREIGN PATENT DOCUMENTS

| EP | 0 298 700 | 1/1989 |
| EP | 0681 914 | 11/1995 |
| EP | 0 721 967 | 7/1996 |
| EP | 0 735 090 | 10/1996 |
| EP | 0 848 048 | 6/1998 |

OTHER PUBLICATIONS

S. Bensason, et al., "Blends of Homogenous Ethylene–Octene Copolymers", *Polymer*, 1997 vol. 38, No. 14, pp. 3513–3520.

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

A tacky film is provided which is self-tacky, has a satisfactory tack strength when adhered to itself, can have any desired tack strength, and has satisfactory blocking resistance. In particular, a tacky film suitable for use as a tacky layer of a pallet stretch film is provided. A tacky film comprising a linear low-density polyethylene having an MFR of from 0.1 to 10 g/10 min and a density of from 0.884 to 0.910 g/cm³; or a tacky film comprising a polyethylene resin composition which is a resin composition obtained by blending ingredient A [a linear low-density polyethylene having an MFR of from 0.1 to 10 g/10 min and a density of from 0.890 to 0.940 g/cm³] with ingredient B [a linear low-density polyethylene having an MFR of from 0.1 to 50 g/10 min and giving, in differential scanning calorimetry (DSC), a melting peak whose extrapolated melting termination temperature is 98° C. or lower] and which has an ingredient B content of 80% by weight or lower and a density of from 0.884 to 0.910 g/cm³.

10 Claims, 1 Drawing Sheet

TACKY FILMS

TECHNICAL FIELD

The present invention relates to a tacky film. More particularly, the invention relates to a tacky film which is self-tacky, has a satisfactory tack strength when adhered to itself, can have any desired tack strength, and has satisfactory blocking resistance. The invention further relates to a tacky film suitable for use as one or more tacky layers (the innermost tacky layer and/or the outermost tacky layer) of a pallet stretch film.

BACKGROUND ART

A typical layer constitution of pallet stretch films is a three-layer structure employing a "copolymer of ethylene and vinyl acetate (hereinafter abbreviated as "EVA")" containing a pressure-sensitive adhesive as the inner layer and the outer layer and a "linear low-density polyethylene (hereinafter abbreviated as "LLDPE") as the interlayer. For example, in forming a blown film having the multilayer structure, both edges of the film are cut off to separate the film into two sheets, which are wound on paper tubes. The film which has been thus cut off is pelletized again and then blended with an LLDPE and this blend is introduced as it is into the hopper of a molding machine for the interlayer and used in film production. The incorporation of the reclaimed pellets into the LLDPE results in a film strength decrease of about 20%. This is because an EVA has come into the reclaimed pellets. There is hence a desire for a film not containing an EVA, i.e., a multilayer film in which all the layers are constituted of an LLDPE.

The tacky layers comprising an EVA contain a pressure-sensitive adhesive, and expensive materials are currently used, such as a liquid polybutene, sorbitan oleate, diglycerol dioleate, and the like. The degree of tackiness varies depending on applications, ranging from "strong tackiness" through "ordinary tackiness" to "weak tackiness". Although the pressure-sensitive adhesives shown above are used in combination in order to obtain a target tack strength, it is necessary in this case to change the incorporation amounts of the pressure-sensitive adhesives, etc. There has hence been a problem that various pressure-sensitive adhesive masterbatches should be used. Besides having this problem, these pressure-sensitive adhesives are expensive. Consequently, there also is a desire for the development of a tacky film to which a target tack strength can be easily imparted without using any of those pressure-sensitive adhesives.

Objects of the invention are to provide a tacky film satisfying the desire. Specifically, a first object of the invention is to provide a tacky film containing none of the pressure-sensitive adhesives enumerated above, i.e., to provide a tacky film which is a film having self-tackiness, has a satisfactory tack strength when adhered to itself, can be easily made to have any desired tack strength, and has satisfactory blocking resistance. A second object is to provide a tacky film which is especially suitable for use as one or more tacky layers (the innermost tacky layer and/or the outermost tacky layer) of a pallet stretch film.

The present inventors made intensive studies in order to obtain the desired tacky film. As a result, they have found that the desired tacky film is obtained by using a linear low-density polyethylene having specific properties and forming it into a film, or by using a composition which is a resin composition obtained by blending in a specific proportion two linear low-density polyethylenes having specific properties and which has a density within a specific range and forming the composition into a film.

The invention has thus been completed.

DISCLOSURE OF THE INVENTION

Namely, a feature of the invention (a matter specifying the invention) resides in "a tacky film comprising a linear low-density polyethylene having an MFR of from 0.1 to 10 g/10 min and a density of from 0.884 to 0.910 g/cm$^3$".

Another feature of the invention (another matter specifying the invention) resides in "a tacky film comprising a polyethylene resin composition which is a composition obtained by blending ingredient A shown below with ingredient B shown below and which has an ingredient B content of 80% by weight or lower and a density of from 0.884 to 0.910 g/cm$^3$, ingredient A: a linear low-density polyethylene having the following properties (1) and (2);
 (1) to have an MFR of from 0.1 to 10 g/10 min,
 (2) to have a density of from 0.890 to 0.940 g/cm$^3$, ingredient B: a linear low-density polyethylene having the following properties (3) and (4);
 (3) to have an MFR of from 0.1 to 50 g/10 min,
 (4) to give, in differential scanning calorimetry (DSC), a melting peak whose extrapolated melting termination temperature is 98° C. or lower".

BEST MODE FOR CARRYING OUT THE INVENTION

Figure 1:
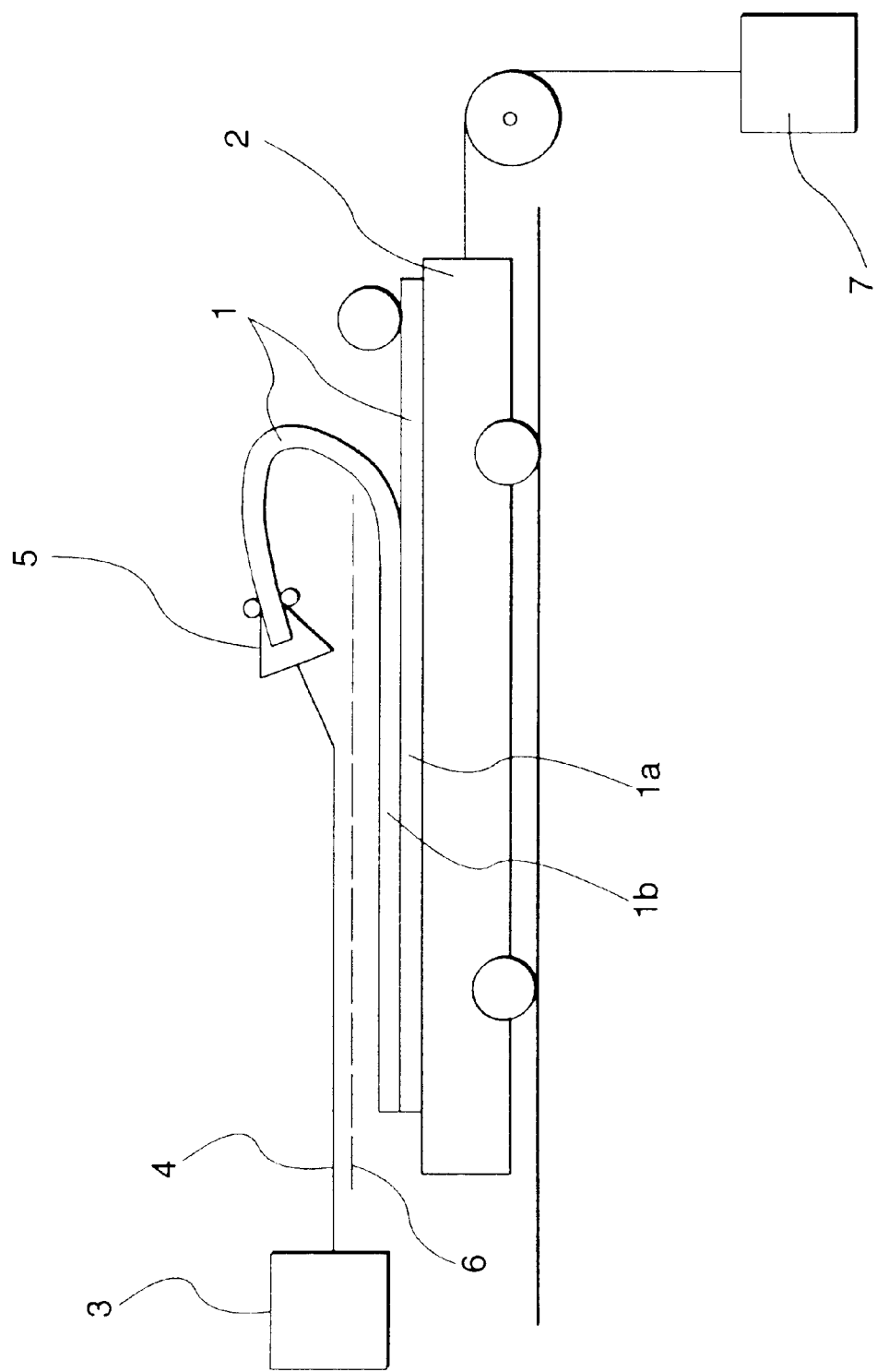
FIG. 1 is a diagrammatic view which shows a "180° peeling tack strength measuring method" and is used for illustrating a method of measuring the "180° peeling tack strengths" of the tacky films obtained in Examples according to the invention and Comparative Examples.

The tacky film comprising a polyethylene resin composition according to the invention can be made to fully exhibit its performances even when used alone as a film. However, when a multilayer film is formed using the tacky film of the invention as one layer and a polyethylene resin layer as another layer, then this multilayer film exhibits even better performances from the standpoints of tear strength, etc., when used as a pallet stretch film.

The term "multilayer film comprising the tacky film of the invention as one layer and a polyethylene resin layer as another layer" means that when the film layer according to the invention is present as the innermost layer and/or the outermost layer of the multilayer film, then this multilayer film may contain one or more other layers made of one or more other polyethylene resins.

As long as the objects of the invention are accomplished, a layer consisting of the tacky film of the invention need not be formed over the whole surface of the multilayer film. Consequently, such a multilayer film is included in the invention.

In the best embodiment of the tacky film according to the invention, a polyethylene resin composition is used which is a composition comprising ingredient A "a linear low-density polyethylene having a specific MFR and a specific density" and ingredient B "a linear low-density polyethylene having a specific MFR and giving, in differential scanning calorimetry (DSC), a melting peak having a specific extrapolated melting termination temperature" and having a specific density and in which ingredient A has been blended with ingredient B in any desired proportion within a range in which the ingredient B content in the composition does not exceed 80% by weight. By thus blending ingredient A with ingredient B in any desired proportion within the specific range, a tacky film can be provided which has any desired tack strength in the range of from "weak tackiness" to "strong tackiness".

Ingredient A can be used alone. In this case, a tacky film having any desired tack strength in the range of from "weak tackiness" to "ordinary tackiness" can be provided, and this also is a preferred mode of the invention. However, in the case of using ingredient A alone, it is necessary to employ a linear low-density polyethylene having a specific density as in the case of the composition described above obtained by blending ingredient A with ingredient B.

A detailed explanation will be given below on each of the linear low-density polyethylenes specified in the invention, processes for producing the same, film formation, etc.

1. Property Values of Linear Low-Density Polyethylenes 1-1 Ingredient A

The linear low-density polyethylene used as ingredient A in the invention should have the following properties (1) and (2).

(1) To have an MFR (melt flow rate) in accordance with JIS-K7210 of "from 0.1 to 10 g/10 min". The MFR thereof is preferably from 0.3 to 8 g/10 min, more preferably from 0.5 to 6 g/10 min. Values of the MFR exceeding "10 g/10 min" are undesirable in that heat resistance and film strength decrease and film formation becomes unstable. Conversely, values of the MFR lower than "0.1 g/10 min" are undesirable in that the results are an elevated resin pressure and reduced extrudability.

(2) To have a density in accordance with JIS-K7112 of "from 0.890 to 0.940 g/cm$^3$". The density thereof is preferably from 0.894 to 0.935 g/cm$^3$. Values of the density exceeding "0.940 g/cm$^3$" are undesirable in that self-tackiness becomes poor, resulting in a reduced tack strength between films. Values of the density lower than "0.890 g/cm$^3$" are undesirable in that the result is an increased tack strength, i.e., strong tackiness, and this is counter to the invention's spirit of obtaining "films ranging from weak tackiness to strong tackiness" using two linear low-density polyethylenes.

On the other hand, in the case where ingredient A is used alone in the invention, the density should be "from 0. 884 to 0.910 g/cm$^3$". Densities thereof exceeding "0.910 g/cm$^3$" are undesirable in that self-tackiness becomes poor, resulting in a reduced tack strength between films. Values of the density lower than "0.884 g/cm$^3$" are undesirable in that blocking becomes severe and the films are not peeled from each other.

1-2 Ingredient B

The linear low-density polyethylene used as ingredient B in the invention should have the following properties (3) and (4).

(3) To have an MFR (melt flow rate) in accordance with JIS-K7210 of "from 0.1 to 50 g/10 min". The MFR thereof is preferably from 0.3 to 45 g/10 min, more preferably from 0.5 to 40 g/10 min. Values of the MFR exceeding "50 g/10 min" are undesirable in that heat resistance and film strength decrease and film formation becomes unstable. Conversely, values of the MFR lower than "0.1 g/10 min" are undesirable in that the results are an elevated resin pressure, reduced extrudability, and the generation of hard spots to give a film having an impaired appearance.

(4) To give, in differential scanning calorimetry (DSC), a melting peak whose extrapolated melting termination temperature is "98° C. or lower". The extrapolated melting termination temperature is preferably 95° C. or lower. Values of the extrapolated melting termination temperature exceeding "98° C." are undesirable in that this ingredient B, when blended with ingredient A, reduces the tack strength.

1-3 In the case where a composition obtained by blending the ingredient A with the ingredient B is used in the invention, the density of this composition should be within the following range.

To have a density in accordance with JIS-K7112 of "from 0.884 to 0.910 g/cm$^3$". Values of this density exceeding "0.910 g/cm$^3$" are undesirable in that self-tackiness becomes poor, resulting in a reduced tack strength between films. Values of the density lower than "0.884 g/cm$^3$" are undesirable in that blocking becomes severe and the films are not peeled from each other.

As long as ingredient A has a density within the range shown above, this ingredient A can be used alone without the necessity of blending ingredient B therewith, as stated above. This is preferred in obtaining "a film which is weakly tacky to ordinarily tacky".

1-4 Proportion of Ingredient A to Ingredient B

In the case of using a composition obtained by blending the ingredient A with the ingredient B in the invention, the proportion of the linear low-density polyethylene as this ingredient A to the linear low-density polyethylene as this ingredient B should be such that the content of ingredient B in the composition is "80% by weight or lower". Ingredient B contents in the composition exceeding "80% by weight" are undesirable in that blocking occurs between films and the films are not peeled from each other.

2. Processes for Producing Linear Low-Density Polyethylenes

Processes for producing the linear low-density polyethylenes to be used in the invention are not particularly limited as long as the polyethylenes have the shape and property values shown above, and any desired obvious means (polymerization catalyst, polymerization method, etc.) can be employed.

For example, examples of polymerization catalysts include Ziegler catalysts (i.e., catalysts based on a combination of a supported or unsupported, halogen-containing titanium compound and an organoaluminum compound), Phillips catalysts (i.e., catalysts based on supported chromium ($Cr^{6+}$) oxide), and Kaminsky catalysts (i.e., catalysts based on a combination of a supported or unsupported metallocene compound and an organoaluminum compound, especially an aluminoxane).

Examples of polymerization methods include the slurry method, vapor-phase fluidized-bed method (e.g., the method described in Unexamined Published Japanese Patent Application No. 59-23011), and solution method which are conducted in the presence of those catalysts, and further include the high-pressure pulk polymerization method conducted at a pressure of 200 kg/cm$^2$ or higher and a polymerization temperature of 100° C. or higher.

The linear low-density polyethylenes for use in the invention desirably have a relatively narrow molecular weight distribution because linear low-density polyethylenes having a wide molecular weight distribution give a film having a rough surface, impaired self-tackiness, and reduced tack strength. In particular, use of a Kaminsky catalyst is preferred because a linear low-density polyethylene having a narrow molecular weight distribution is obtained therewith.

Specific examples of production processes include the methods described in Unexamined Published Japanese Patent Applications Nos. 58-19309, 59-95292, 60-35005, 60-35006, 60-35007, 60-35008, 60-35009, 61-130314, and 3-163088, European Patent Publication 420,436, U.S. Pat. No. 5,055,438, International Publication WO 91/04257, etc. Namely, the examples include use of a metallocene catalyst or a metallocene/aluminoxane catalyst and "a method in which ethylene as the major ingredient is copolymerized with an α-olefin having 3 to 18 carbon atoms as a minor ingredient using a catalyst comprising a metallocene compound and a compound which reacts with the metallocene catalyst to become a stable ion" such as those described, e.g., in International Publication WO 92/07123, etc.

The α-olefin used as a comonomer is a 1-olefin having 3 to 18 carbon atoms. Examples thereof include propylene, 1-butene, 1-pentene, 1-hexene, 1-octene, 1-heptene, 4-methylpentene-1, 4-methylhexene-1, 4,4-dimethylpentene-1, and the like.

These α-olefins for use as a comonomer need not be used alone, and copolymers with two or more comonomers, such as terpolymers, also are included as preferred embodiments in the invention.

3. Processes for Producing Tacky Film

In an embodiment of the invention, two linear low-density polyethylenes (ingredient A and ingredient B) are blended with each other in any desired proportion within the specific range shown above, whereby a resin composition for tacky films is obtained which has any (desired) tack strength.

A tacky film can be produced from this resin composition by blending the linear low-density polyethylene of ingredient A with the linear low-density polyethylene of ingredient B in the specific proportion according to the same method as in a process for producing ordinary resin compositions and then forming the composition into a film.

For example, a technique can be employed which comprises dry-blending the linear low-density polyethylene of ingredient A with the linear low-density polyethylene of ingredient B beforehand, introducing the blend as it is into the hopper of a film-forming machine, and forming the blend into a film. Another usable technique comprises melt-kneading the polyethylenes with an extruder, Brabender Plastograph, Banbury mixer, kneader blender, or the like, pelletizing the blend by an ordinarily used method, and then forming the pellets into a film.

Auxiliary additive ingredients generally used for resin compositions, such as, e.g., antioxidants (phenolic and phosphorus compound antioxidants are especially preferred), antiblocking agents, slip agents, heat stabilizers, ultraviolet absorbers, neutralizing agents, antifogging agents, colorants, antibacterial agents, and/or adhesives, can be incorporated into each of ingredient A alone (when ingredient A is not blended with ingredient B) and a composition obtained by blending ingredient A with ingredient B. The linear low-density polyethylene(s) containing such auxiliary additives can be formed into a film to thereby obtain a tacky film. This film also is included in the invention.

Furthermore, a polymer obtained using other copolymerizable monomer(s), e.g., a high-pressure low-density polyethylene, a linear low-density polyethylene, or the like, can be incorporated in such a degree as not to impair the effects of the invention, i.e., in an amount of from 5 to 30% by weight based on the total weight of ingredient A alone (when ingredient A is not blended with ingredient B) or a composition obtained by blending ingredient A with ingredient B. Films obtained from such resin compositions are also included in the invention.

4. Formation of Single-Layer Film and Multilayer Film

Ingredient A alone according to the invention (when ingredient A is not blended with ingredient B) or a composition obtained by blending ingredient A with ingredient B is formed into a film, and this film alone or a laminate thereof with another polyethylene resin can be used as a pallet stretch film.

In the case where a layer of either ingredient A alone (when ingredient A is not blended with ingredient B) or a composition obtained by blending ingredient A with ingredient B is laminated to a layer of another polyethylene resin in the invention, the formation or laminating of these layers can be one suitable for purposes. Namely, the film formation or laminating can be conducted according to conventional methods for forming a multilayer film. For example, use can be made, for example, of a method in which the layers each in a film form are separately formed beforehand and are then bonded and laminated to each other or a method in which the layers are formed and laminated in the same step by extrusion.

In the case of producing a film by the former method, examples of usable techniques include air-cooling film blowing, two-stage air-cooling film blowing, T-die film formation, water-cooling film blowing, and the like. As the latter extrusion method, use can be made of extrusion laminating, dry laminating, sandwich laminating, coextrusion (including coextrusion in which an adhesive layer is not formed, coextrusion in which an adhesive layer is formed, and coextrusion in which an adhesive resin is incorporated), or the like. In the invention, various multilayer films can be obtained by any of those methods.

A typical embodiment of the pallet stretch film according to the invention has a film constitution having either a layer of ingredient A alone (when ingredient A is not blended with ingredient B) or a layer of a resin obtained by blending ingredient A with ingredient B as the innermost layer or outermost layer or as each of the innermost and outermost layers, because the ingredient A layer and the resin layer each has self-tackiness, can be easily made to have any desired tack strength, is usable in various applications ranging from strong tackiness to weak tackiness, and has satisfactory blocking resistance.

Also in the case where ingredient A alone (when ingredient A is not blended with ingredient B) or a composition obtained by blending ingredient A with ingredient B is formed alone into a film in the invention, aforementioned techniques such as film blowing and T-die film formation can be employed.

EXAMPLES

Next, the invention will be explained below in more detail by reference to Examples of the invention and Comparative Examples. Prior to this explanation, detailed explanations will be given on "methods of measuring properties" of the linear low-density polyethylenes used in the invention and in the following Examples and Comparative Examples, "methods of evaluating properties" of the films obtained in the Examples and Comparative Examples, and "preparation (syntheses) of the linear low-density polyethylenes" used as "ingredient A" and "ingredient B" in the Examples and Comparative Examples, and further on means for forming the prepared linear low-density polyethylenes into film.

1. "Methods of Measuring Properties" of Linear Low-Density Polyethylenes 1-1 MFR: Measurement was made in accordance with JIS-K7210 (190° C., 2.16 kg load).

1-2 Density: Measurement was made in accordance with JIS-K7112.

1-3 Extrapolated Melting Termination Temperature in Differential Scanning Calorimetry (DSC):

About 5 mg of a sample was weighed out from a 100-$\mu$m film formed by hot pressing. This sample was set in DSC apparatus RDC 220, manufactured by Seiko Instruments Inc., heated to 170° C., kept at this temperature for 5 minutes, and then cooled to −10° C. at a cooling rate of 10° C./min. Subsequently, the sample was held for 1 minute and then heated to 170° C. at a heating rate of 10° C./min to make a measurement. Namely, a DSC melting curve was obtained through the heating from −10° C. to +170° C.

In accordance with JIS-K7121, the "extrapolated melting termination temperature" was determined by extending the higher-temperature-side base line of the DSC melting curve toward the lower-temperature side, drawing a tangent touching the higher-temperature-side curve of the melting peak at the point where the gradient was maximum, and taking the temperature corresponding to the point of intersection of the extension and the tangent as the "extrapolated melting termination temperature".

2. "Methods of Evaluating Film Properties"

2-1 "180° Peeling Viscosity Strength"

A film formed by film blowing (in the form of two films whose inner sides were in contact with each other) was cut into a size of 100 mm in width by 200 mm in length in a 23° C. thermostatic chamber. The two adherent films were peeled from each other and then superposed on each other so that the inner side of one film came into contact with the outer side of the other. A load of 15 kg was imposed thereon for 5 minutes. The 180° peeling tack strength was measured with a slip tester (Type HEIDON-14, manufactured by Shinto Kagaku K.K.) in which a load of 200 g had been attached to the front end of a smooth plate so that the smooth plate was movable at a high speed due to the load.

This method of measurement is explained in detail by reference to FIG. 1. The two superposed films 1 are placed on a smooth plate 2. The lower film 1a is fixed, while the upper film 1b is nipped by a clip 5. The clip 5 is connected to a load cell 3 with a monofilament 4. The clip 5 is placed on a paper 6 laid on the upper film 1a. Subsequently, the smooth plate 2 is moved at a high speed. The maximum strength obtained when the two films 1 were undergoing 180° peeling was taken as the "180° peeling tack strength value". (Numeral 7 in FIG. 1 denotes a load.)

2-2 "180° Blocking Peel Strength"

A film formed by film blowing (in the form of two films whose inner sides were in contact with each other) was cut into a size of 100 mm in width by 200 mm in length in a 23° C. thermostatic chamber. The 180° blocking peel strength was measured with a slip tester (Type HEIDON-14, manufactured by Shinto Kagaku K.K.).

Specifically, the films whose inner sides are adherent to each other (which have been kept adherent since film formation) are placed on a smooth plate. The lower film is fixed, while the upper film is nipped by a clip. The clip is connected to a load cell with a monofilament. As in the measurement of 180° peeling tack strength, the clip is placed on a paper laid on the upper film. Subsequently, the smooth plate is moved at a speed of 150 mm/min. The strength obtained when the two films were undergoing 180° peeling was taken as the "180° blocking peel strength value".

2-3 "Self-Tackiness"

A film formed by film blowing (in the form of two films whose inner sides are in contact with each other) is cut into a size of 50 mm in width by 200 mm in length in a 23° C. thermostatic chamber. After the two adherent films are peeled from each other, one film is placed so that the outer side faces upward. The other film is held so that the inner side faces downward, and is then superposed on the film which has been placed (the outer side of one film comes into close contact with the inner side of the other). In this operation, the films are not pressed with fingers, etc. The self-tackiness was evaluated based on the following criteria.

◯: When the overlying film was pulled up, the lower film was also lifted up because the films were adherent to each other.

x: The films were not adherent to each other and the lower film was not lifted up.

("◯" means that the films have self-tackiness, while "x" means that the films do not have self-tackiness.)

3. "Preparation of Linear Low-Density Polyethylenes"

3-1 Synthesis of "PE-1"

A catalyst was prepared by the method described in Unexamined Published Japanese Patent Application No. 61-130314. Namely, methylaluminoxane manufactured by Toyo Stauffer Chemical Co., Ltd. was added to 2.0 mmol of ethylenebis(4,5,6,7-tetrahydroindenyl)zirconium dichloride in an amount 1,000 times by mol the amount of the complex. This mixture was diluted with toluene to 10 liters to prepare a catalyst solution.

Next, polymerization was conducted by the following method. First, a mixture of ethylene and 1-hexene was fed to a continuous reactor of the stirring autoclave type having a capacity of 1.5 liters so as to result in a 1-hexene proportion of 83% by weight. Subsequently, the pressure inside the reactor was held at 1,300 kg/cm$^2$, and a reaction was then conducted at a temperature of 105° C. in the presence of the catalyst.

After completion of the reaction, a linear low-density polyethylene was obtained which was an ethylene/1-hexene copolymer having an MFR of 2.2 g/10 min and a density of 0.895 g/cm$^3$ (hereinafter, this polyethylene will be referred to as "PE-1").

3-2 Synthesis of "PE-2"

Catalyst preparation and polymerization were conducted in the same manners as those for "PE-1" described above, except that the proportion of 1-hexene during polymerization and the polymerization temperature were changed.

As a result, a linear low-density polyethylene was obtained which was an ethylene/1-hexene copolymer having an MFR of 3.5 g/10 min and a density of 0.880 g/cm$^3$ and giving, in differential scanning calorimetry (DSC), a melting peak whose extrapolated melting termination temperature was 80° C. (hereinafter, this polyethylene will be referred to as "PE-2").

3-3 Synthesis of "PE-3"

Catalyst preparation and polymerization were conducted in the same manners as those for "PE-1" described above, except that the proportion of 1-hexene during polymerization and the polymerization temperature were changed.

As a result, a linear low-density polyethylene was obtained which was an ethylene/1-hexene copolymer having an MFR of 3.5 g/10 min and a density of 0.900 g/cm$^3$ and giving, in differential scanning calorimetry (DSC), a melting peak whose extrapolated melting termination temperature was 100° C. (hereinafter, this polyethylene will be referred to as "PE-3").

4. "Film-Forming Method"

Using the linear low-density polyethylenes prepared by the methods described above, air-cooling film blowing was conducted under the following forming conditions.

Forming Conditions

Machine: Air-cooling film blowing machine manufactured by Tomy Co., Ltd.
Screw diameter: 40 mmφ
L/D: 24
Temperature: 180° C.
Die diameter: 75 mmφ
Die lip: 3 mm
Die temperature: 180° C.
Blowing ratio: 2.1
Haul-off speed: 9 m/min
Film thickness: 50 μm Example 1

"PE-1" was used as a linear low-density polyethylene. This polyethylene was introduced as it was into the hopper of the air-cooling film blowing machine to produce a film. This film was evaluated by the "Methods of Evaluating Film Properties" described above. The evaluation results are as shown in Table 1. (This film corresponds to the case where ingredient A is used alone (ingredient A is not blended with ingredient B).)

Example 2

Eighty percents by weight of "PE-1" as a linear low-density polyethylene of ingredient A was added to and dry-blended with 20% by weight of "PE-2" as a linear low-density polyethylene of ingredient B. Thereafter, the blend was introduced as it was into the hopper of the air-cooling film blowing machine to produce a film. This film was evaluated by the "Methods of Evaluating Film Properties" described above. The evaluation results are as shown in Table 1. The composition obtained by blending ingredient A with ingredient B had a density of 0.893 g/cm$^3$.

Example 3

Sixty percents by weight of "PE-1" as a linear low-density polyethylene of ingredient A was added to and dry-blended with 40% by weight of "PE-2" as a linear low-density polyethylene of ingredient B. Thereafter, the blend was introduced as it was into the hopper of the air-cooling film blowing machine to produce a film. This film was evaluated by the "Methods of Evaluating Film Properties" described above. The evaluation results are as shown in Table 1. The composition obtained by blending ingredient A with ingredient B had a density of 0.890 g/cm$^3$.

Example 4

Forty percents by weight of "PE-1" as a linear low-density polyethylene of ingredient A was added to and dry-blended with 60% by weight of "PE-2" as a linear low-density polyethylene of ingredient B. Thereafter, the blend was introduced as it was into the hopper of the air-cooling film blowing machine to produce a film. This film was evaluated by the "Methods of Evaluating Film Properties" described above. The evaluation results are as shown in Table 1. The composition obtained by blending ingredient A with ingredient B had a density of 0.888 g/cm$^3$.

Example 5

Twenty-five percents by weight of "PE-1" as a linear low-density polyethylene of ingredient A was added to and dry-blended with 75% by weight of "PE-2" as a linear low-density polyethylene of ingredient B. Thereafter, the blend was introduced as it was into the hopper of the air-cooling film blowing machine to produce a film. This film was evaluated by the "Methods of Evaluating Film Properties" described above. The evaluation results are as shown in Table 1. The composition obtained by blending ingredient A with ingredient B had a density of 0.885 g/cm$^3$.

Comparative Example 1

Ten percents by weight of "PE-1" as a linear low-density polyethylene of ingredient A was added to and dry-blended with 90% by weight of "PE-2" as a linear low-density polyethylene of ingredient B. Thereafter, the blend was introduced as it was into the hopper of the air-cooling film blowing machine to produce a film. This film was evaluated by the "Methods of Evaluating Film Properties" described above. The evaluation results are as shown in Table 1. The composition obtained by blending ingredient A with ingredient B had a density of 0.883 g/cm$^3$.

As apparent from the "Evaluation Results" in Table 1 which will be given later, the film obtained had a high 180° blocking peel strength although excellent in 180° peeling tack strength. This film was less apt to be peeled from itself and had exceedingly poor workability.

Comparative Example 2

Seventy-five percents by weight of "Novatec LL" UF420, manufactured by Japan Polychem Co., Ltd., as a linear low-density polyethylene of ingredient A was added to and dry-blended with 25% by weight of "PE-2" as a linear low-density polyethylene of ingredient B. Thereafter, the blend was introduced as it was into the hopper of the air-cooling film blowing machine to produce a film. This film was evaluated by the "Methods of Evaluating Film Properties" described above. The evaluation results are as shown in Table 1. The composition obtained by blending ingredient A with ingredient B had a density of 0.915 g/cm$^3$.

As apparent from the "Evaluation Results" in Table 1 which will be given later, the 180° peeling tack strength of the film obtained was too low and not on a practical level, although the film had an excellent 180° blocking peel strength. Furthermore, it had poor self-tackiness.

Comparative Example 3

Ten percents by weight of "Novatec LL" UF420, manufactured by Japan Polychem Co., Ltd., as a linear low-density polyethylene of ingredient A was added to and dry-blended with 90% by weight of "PE-2" as a linear low-density polyethylene of ingredient B. Thereafter, the blend was introduced as it was into the hopper of the air-cooling film blowing machine to produce a film. This film was evaluated by the "Methods of Evaluating Film Properties" described above. The evaluation results are as shown in Table 1. The composition obtained by blending ingredient A with ingredient B had a density of 0.885 g/cm$^3$.

As apparent from the "Evaluation Results" in Table 1 which will be given later, the film obtained had a high 180° blocking peel strength although excellent in 180° peeling tack strength. This film was less apt to be peeled from itself and had exceedingly poor workability.

Comparative Example 4

"Novatec LL" UF420, manufactured by Japan Polychem Co., Ltd., was used as a linear low-density polyethylene of ingredient A. This polyethylene was introduced as it was into the hopper of the air-cooling film blowing machine to produce a film. This film was evaluated by the "Methods of Evaluating Film Properties" described above. The evaluation results are as shown in Table 1. This film corresponds to the case where ingredient A is used alone (ingredient A is not blended with ingredient B). The ingredient A has a density of 0.925 g/cm$^3$.

As apparent from the "Evaluation Results" in Table 1 which will be given later, the 180° peeling tack strength of the film obtained was too low and not on a practical level, although the film had an excellent 180° blocking peel strength. Furthermore, it had poor self-tackiness.

Comparative Example 5

Eighty percents by weight of "PE-1" as a linear low-density polyethylene of ingredient A was blended with 20% by weight of "PE-3" as a linear low-density polyethylene of ingredient B. The blend was introduced as it was into the hopper of the air-cooling film blowing machine to produce a film. This film was evaluated by the "Methods of Evaluating Film Properties" described above. The evaluation results are as shown in Table 1. The composition obtained by blending ingredient A with ingredient B had a density of 0.897 g/cm$^3$.

As apparent from the "Evaluation Results" in Table 1 which will be given later, the 180° peeling tack strength of the film obtained was slightly low and not on a practical level, although the film had an excellent 180° blocking peel strength. Furthermore, the composition was counter to the invention's spirit of being capable of easily obtaining any desired tack strength (ranging from weak tackiness to strong tackiness) using two linear low-density polyethylenes.

resistance. Consequently, a tacky film can be provided which is especially suitable for use as one or more tacky layers (the innermost tacky layer and/or the outermost tacky layer) of a pallet stretch film.

What is claimed is:

1. A tacky film characterized by comprising a polyethylene resin composition which is a composition obtained by blending ingredient A shown below with ingredient B shown below and which has an ingredient B content of 80% by weight or lower and a density of from 0.884 to 0.910 g/cm$^3$,
    ingredient A: a linear low-density polyethylene having the following properties (1) and (2);
        (1) to have an MFR of from 0.1 to 10 g/10 min,
        (2) to have a density of from 0.890 to 0.940 g/cm$^3$,
    ingredient B: a linear low-density polyethylene having the following properties (3) and (4);
        (3) to have an MFR of from 0.1 to 50 g/10 min,
        (4) to give, in differential scanning calorimetry (DSC), a melting peak whose extrapolated melting termination temperature is 98° C. or lower.

2. The tacky film of claim 1, characterized in that the linear low-density polyethylenes as ingredients A and B each is a polyethylene resin obtained using as a polymerization catalyst a metallocene compound containing a tetravalent transition metal.

3. The tacky film of claim 1, characterized by being used as the innermost layer and/or the outermost layer of a pallet stretch film.

4. The tacky film of claim 1, wherein ingredient A and ingredient B are a polyethylene resin which is copolymerized with ethylene as a major ingredient and a α-olefin having 3 to 18 carbon atoms as a minor ingredient.

5. The tacky film of claim 1, wherein ingredient A is a liner low-density polyethylene having a MFR of 0.3 g/10 min to 8 g/10 min.

TABLE 1

Examples 1–5, Comparative Examples 1–5

| Constitution of Tacky Film and Evaluation Results | | Example/Comparative Example division | | | | | | | | | |
|---|---|---|---|---|---|---|---|---|---|---|---|
| | | Example | | | | | Comparative Example | | | | |
| | | 1 | 2 | 3 | 4 | 5 | 1 | 2 | 3 | 4 | 5 |
| (Constitution) | | | | | | | | | | | |
| Ingredient A | MFR (g/10 min) | 2.2 | 2.2 | 2.2 | 2.2 | 2.2 | 2.2 | 0.8 | 0.8 | 0.8 | 2.2 |
| | Density (g/cm$^3$) | 0.896 | 0.896 | 0.896 | 0.896 | 0.896 | 0.896 | 0.925 | 0.925 | 0.925 | 0.896 |
| | Proportion in composition (wt %) | 100 | 80 | 60 | 40 | 25 | 10 | 75 | 10 | 100 | 80 |
| Ingredient B | MFR (g/10 min) | — | 3.5 | 3.5 | 3.5 | 3.5 | 3.5 | 3.5 | 3.5 | — | 3.5 |
| | Extrapolated melting termination temperature (° C.) | — | 80 | 80 | 80 | 80 | 80 | 80 | 80 | — | 100 |
| | Proportion in composition (wt %) | — | 20 | 40 | 60 | 75 | 90 | 25 | 90 | — | 20 |
| Density of "ingredient A + ingredient B" (g/cm$^3$) | | 0.896 | 0.893 | 0.890 | 0.888 | 0.885 | 0.883 | 0.915 | 0.885 | 0.925 | 0.897 |
| (Evaluation Results) | | | | | | | | | | | |
| 180° peeling tack strength (g) | | 40 | 100 | 180 | 250 | 290 | 290 | 5 | 290 | 2 | 15 |
| 180° blocking peel strength (g) | | 4 | 5 | 9 | 10 | 20 | 50 | 2 | 45 | 1 | 4 |
| Self-tackiness | | ○ | ○ | ○ | ○ | ○ | ○ | X | ○ | X | ○ |

INDUSTRIAL APPLICABILITY

The tacky layer film according to the invention is a film which has self-tackiness and need not contain a pressure-sensitive adhesive. This tacky film has a satisfactory tack strength when adhered to itself, can be easily made to have any desired tack strength, and has satisfactory blocking 6. The tacky film of claim 1, wherein ingredient A is a linear low-density polyethylene having a MFR of 0.5 g/10 min to 6 g/10 min.

7. The tacky film of claim 1, wherein ingredient A is a linear low-density polyethylene having a density of from 0.894 g/cm$^3$ to 0.935 g/cm$^3$.

8. The tacky film of claim 1, wherein ingredient B is a linear low-density polyethylene having a MFR of 0.3 g/10 min to 45 g/10 min.

9. The tacky film of claim 1, wherein ingredient B is a linear low-density polyethylene having a MFR of 0.5 g/10 min to 40 g/10 min.

10. The tacky film of claim 1, wherein the ingredient B is a linear low-density polyethylene having a differential scanning calorimetry melting peak with an extrapolated melting termination temperature of 95° C. or lower.

* * * * *